J. M. Spencer,
Lawn Mower.

No. 29,922.

Patented Sep. 4, 1860.

Witnesses.
R. Holady
G. P. Hale Jr.

John M. Spencer

UNITED STATES PATENT OFFICE.

JOHN M. SPENCER, OF ENFIELD, MAINE.

IMPROVEMENT IN HAND MOWING-MACHINES.

Specification forming part of Letters Patent No. 29,922, dated September 4, 1860.

*To all whom it may concern:*

Be it known that I, JOHN M. SPENCER, of Enfield, in the county of Penobscot and State of Maine, have invented an Improved Hand Mowing-Machines; and I do hereby declare that the same is fully described and represented in the following specification and the accompanying drawings, of which—

Figure 2:
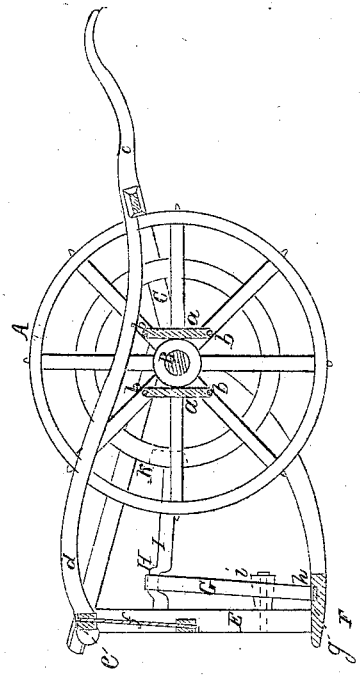
Figure 1:
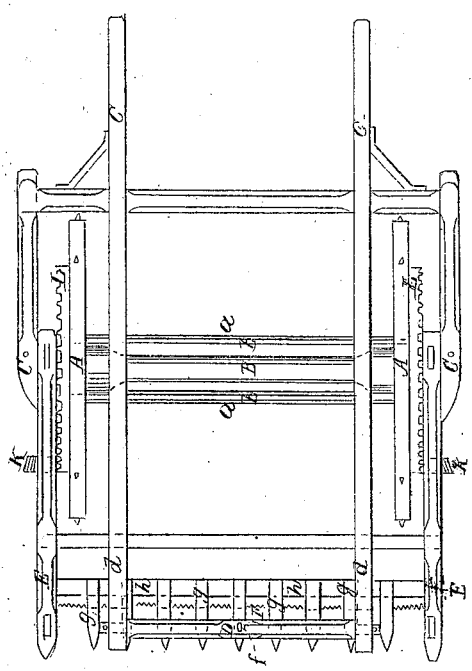
Figure 3:
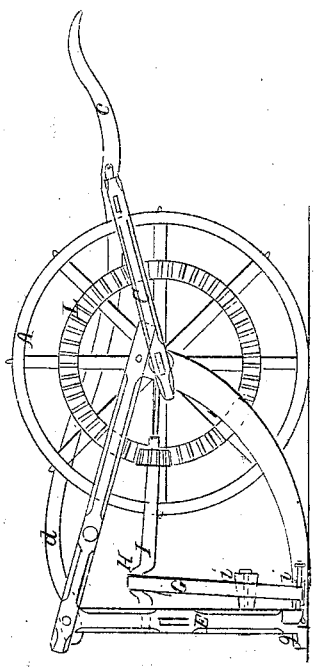

Figure 1 is a top view, Fig. 2 a side elevation, and Fig. 3 a longitudinal section, of it.

The said machine is intended to be put in operation by an individual laying hold of the handles and pressing the machine onward in front of him.

In the drawings, A A exhibit two driving and supporting wheels, connected together by cross-bars $a\ a$ and metallic rods $b\ b$, and so applied to a sustaining-shaft, B as to be capable of revolving freely thereon. To the ends of the said shaft a hand-frame, C, provided with handles $c\ c$, is affixed, the same being formed as shown in the drawings. There projects from the frame C, and forward between the two wheels, a lifter-frame, D, composed of two arms, $d\ d$, united by a rotary shaft, $e$. There is also applied to the shaft B, so as to turn freely vertically on it and between the handle frame and wheels, and so as to extend therefrom, as shown in the drawings, a cutter-frame, E, the same being suspended by means of a rod, $f$, from the middle of the rotary shaft $e$. This cutter-frame carries in the lower part of its front, and extending across it, a series of teeth, $g\ g\ g$, projecting from a cross-bar, $h$, and having a saw or serrated cutter, F, arranged horizontally and so as to slide freely in a longitudinal direction through all of them. Two belts, G G, are affixed respectively to opposite ends of the said saw, and from thence are continued horizontally to and bent around two guides or rollers, $i\ i$, and are led upward from the same to and made to embrace two bell-cranks, H H, carried by two shafts, I I, as shown in the drawings. These shafts are arranged and supported in opposite sides of the cutter-frame, and have their cranks projecting in the same direction. A separate beveled-tooth pinion, K, is affixed to each shaft and made to engage with one of two beveled gears, L L, that are respectively fastened to the outer sides of the two wheels.

When this machine is forced forward by an operative, while laying hold of its handles, the rotary movements of the wheels, by means of the gearing, will set the two shafts I I, with their cranks H H, in revolution, and thereby produce quick longitudinal reciprocating movements of the serrated cutter, which, operating with the teeth $g\ g$, will mow or cut any blades of grass that may intervene between the teeth and be in contact with the cutter. The operative, by means of the handle-frame and cutter-frame lifter, can impel and guide the machine and regulate the distance of the cutter from the ground. He can also allow the cutter-frame to rest and run on the ground, or he can at any moment raise it off the same to clear any roots or obstructions. Thus, while hold of the handles, he has complete control of the machine, and with it can mow grass or grain to great advantage by manual power.

My machine is intended to be a cheap substitute for the usual expensive horse-power mowing-machines, and for use in situation where it would be difficult to employ the latter to advantage. The construction and arrangement of its parts render it very efficient in operation.

I claim—

The arrangement of the serrated cutter E, two sets of gears, K L, two cranked shafts, I I, and the belts G G, applied to such cutter and cranks substantially in manner and to operate as described.

JOHN M. SPENCER.

Witnesses:
R. H. EDDY,
F. P. HALE, Jr.